United States Patent
Hill et al.

(10) Patent No.: US 10,101,033 B2
(45) Date of Patent: Oct. 16, 2018

(54) SPIRAL PULSE DETONATION TUBE CONFIGURATION

(71) Applicant: UNITED TECHNOLOGIES CORPORATION, Farmington, CT (US)

(72) Inventors: James D. Hill, Tolland, CT (US); Michael J. Cuozzo, Palm Beach Gardens, FL (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 333 days.

(21) Appl. No.: 14/573,551

(22) Filed: Dec. 17, 2014

(65) Prior Publication Data

US 2015/0184860 A1  Jul. 2, 2015

Related U.S. Application Data

(60) Provisional application No. 61/921,386, filed on Dec. 27, 2013.

(51) Int. Cl.
| | |
|---|---|
| *F23R 7/00* | (2006.01) |
| *F02K 7/075* | (2006.01) |
| *F02C 5/00* | (2006.01) |
| *F02K 7/02* | (2006.01) |

(52) U.S. Cl.
CPC .................. *F23R 7/00* (2013.01); *F02C 5/00* (2013.01); *F02K 7/02* (2013.01); *F02K 7/075* (2013.01)

(58) Field of Classification Search
CPC ... F02K 7/02; F02K 7/06; F02K 7/067; F02K 7/075; F23R 7/00; F02C 5/00; F02C 5/11
See application file for complete search history.

(56) References Cited

U.S. PATENT DOCUMENTS

| | | | |
|---|---|---|---|
| 2006/0207261 A1* | 9/2006 | Venkataramani | F02K 7/02 60/776 |
| 2009/0102203 A1* | 4/2009 | Lu | F02C 5/12 290/40 R |
| 2009/0266047 A1 | 10/2009 | Kenyon et al. | |
| 2010/0242435 A1* | 9/2010 | Guinan | F02C 3/165 60/247 |
| 2011/0126510 A1 | 6/2011 | Kenyon et al. | |

OTHER PUBLICATIONS

Authors: S. M. Frolov et al.; Title: "Reactive shock and detonation propogation in U-bend tubes"; ScienceDirect; Journal of Loss Prevention in the Process Industries 20 (2007) 501-508; Elsevier; Journal of Loss Prevention in the process industries; Available online at www.sciencedirect.com; 8 pgs.

G.O. Thomas, et al.; Detonation Interaction With Wedges and Bends; Shock Waves (2002) 11: pp. 481-492; 12 pgs.

* cited by examiner

*Primary Examiner* — Craig Kim
*Assistant Examiner* — Katheryn Malatek
(74) *Attorney, Agent, or Firm* — Cantor Colburn LLP

(57) ABSTRACT

An engine includes an elongated pulse detonation combustor tube having an arcuate combustion path over a majority of an entire length of the combustor tube, and an elongated portion of the combustor tube being oriented transverse to a central axis of the engine.

10 Claims, 2 Drawing Sheets

SPIRAL PULSE DETONATION TUBE CONFIGURATION

CROSS-REFERENCE TO RELATED APPLICATIONS

This application claims priority to U.S. Provisional Application No. 61/921,386 filed on Dec. 27, 2013 and titled Spiral Pulse Detonation Tube Configuration, the disclosure of which is hereby incorporated by reference in its entirety.

FIELD

The present disclosure relates generally to a pulse detonation combustor, and, more particularly, to configuration of pulse detonation tubes within a pulse detonation combustor.

BACKGROUND

A conventional gas turbine engine employs one or more combustors positioned next to a compressor. Compressor exit air is mixed with fuel in the combustors and is burned, converting chemical energy to heat, expanding the air, and accelerating mass flow through a turbine. Certain turbine engines employ pulse detonation combustors.

Events peculiar to detonation combustion, such as mixing, ignition and deflagration-to-detonation transition, typically require larger dimension(s) to accommodate the pulse detonation tubes utilized for this type of combustion. It is desirable to provide continued improvements in efficiency using detonation combustion while minimizing any negative effects on an engine's size, weight, and rotordynamics.

SUMMARY

Disclosed and claimed herein is an engine which includes an elongated pulse detonation combustor tube having an arcuate combustion path over a majority of an entire length of the combustor tube, and an elongated portion of the combustor tube being oriented transverse to a central axis of the engine. As a result, a length of the pulse detonation combustor tube is substantially longer than an axial distance the combustor tube occupies. In one embodiment, the pulse detonation combustor tube is disposed circumferentially around at least one component of the engine like a spiral.

Other aspects, features, and techniques will be apparent to one skilled in the relevant art in view of the following detailed description of the embodiments.

BRIEF DESCRIPTION OF THE DRAWINGS

The drawings accompanying and forming part of this specification are included to depict certain aspects of the present disclosure. A clearer conception of the present disclosure, and of the components and operation of systems provided with the present disclosure, will become more readily apparent by referring to the exemplary, and therefore non-limiting, embodiments illustrated in the drawings, wherein like reference numbers (if they occur in more than one view) designate the same elements. The present disclosure may be better understood by reference to one or more of these drawings in combination with the description presented herein. It should be noted that the features illustrated in the drawings are not necessarily drawn to scale.

DESCRIPTION

One aspect of the disclosure relates to pulse detonation tubes for combustors in gas engines. Embodiments of the present disclosure will be described hereinafter with reference to the attached drawings.

Figure 1:
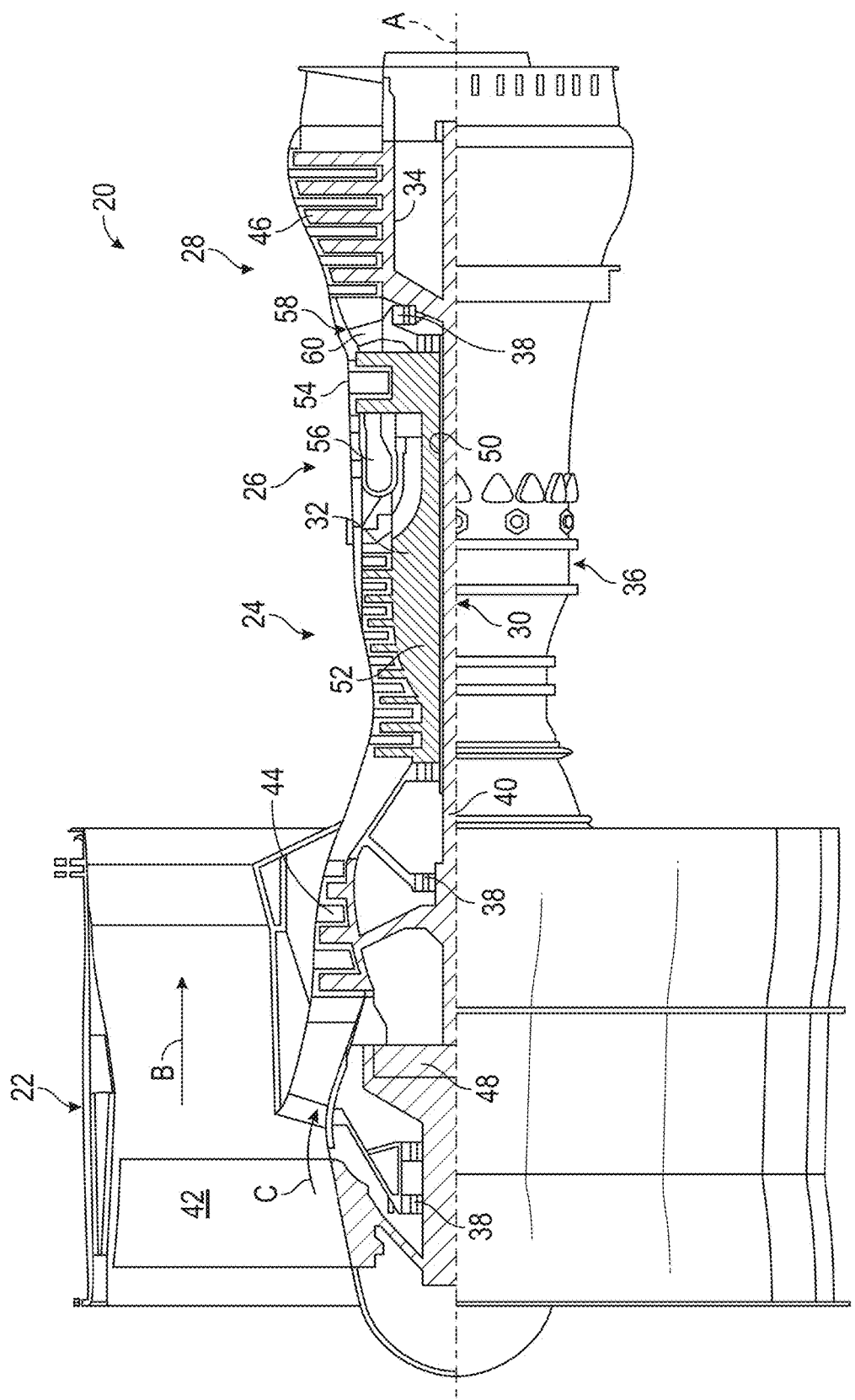
FIG. 1 schematically illustrates a gas turbine engine.

FIG. 1 schematically illustrates an exemplary gas turbine engine 20. Embodiments of pulse detonation combustor tubes of the present disclosure are intended to function as a drop-in replacement for or a supplement to standard combustors of various types of gas turbine engines. By way of example, the gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. A mid-turbine frame of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second.

Figure 2A:
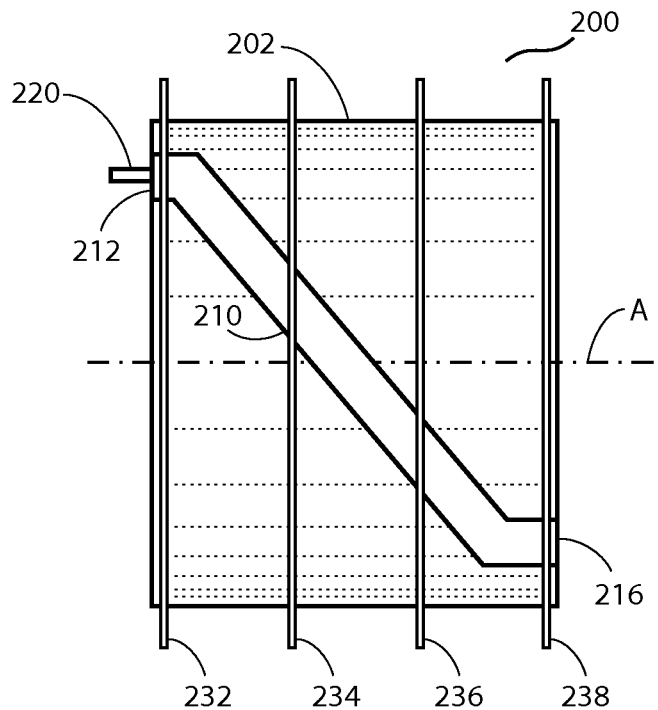
FIGS. 2A and 2B are a side and a front view, respectively, of a pulse detonation system according to an embodiment of the present disclosure.
Figure 2B:
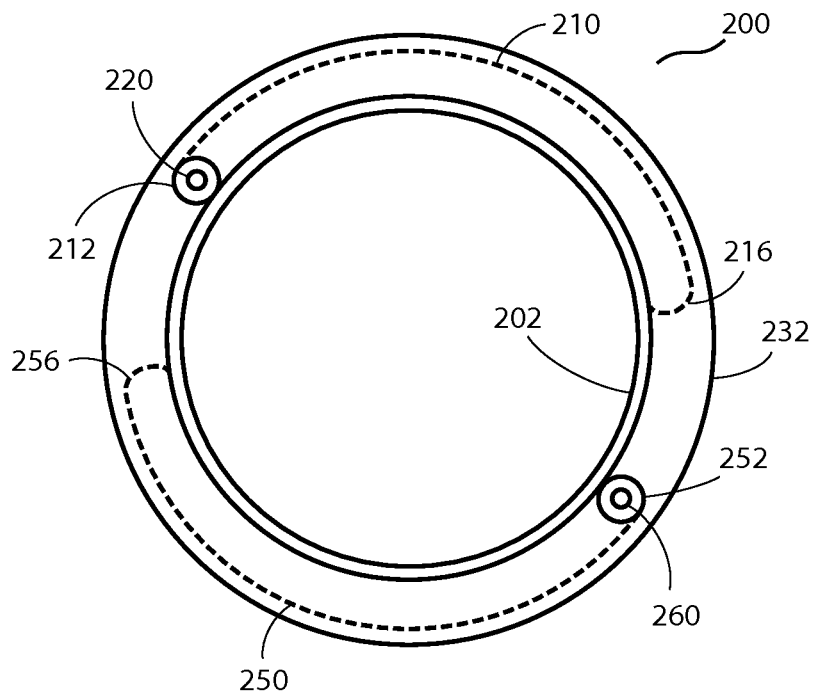

FIGS. 2A and 2B are a side and a front view, respectively, of a pulse detonation system 200 according to an embodiment of the present disclosure. A pulse detonation system may include one or more pulse detonation tubes configured to combust the fuel-air mixture using a detonation reaction. Within a pulse detonation tube, the combustion reaction is driven by a detonation wave that moves at supersonic speed, thereby increasing the efficiency of the combustion process. Specifically, air and fuel are typically injected into the pulse detonation tube in discrete pulses. The fuel-air mixture is then detonated by an ignition source, thereby establishing a detonation wave that propagates through the tube at a supersonic velocity. The detonation process produces pressurized exhaust gas within the pulse detonation tube that ultimately drives a turbine to rotate.

Referring to FIG. 2A, a side view of the pulse detonation system 200 is illustrated, which includes an engine core 202, a pulse detonation tube combustor 210 and a plurality of mounting brackets 232-238. The engine core 202 can be a cylindrical structure disposed around the central longitudinal axis A. The engine core 202 has an inlet that is downstream of the compressor section 24 and an outlet that is upstream of the turbine section 28 (see FIG. 1). In one embodiment, the pulse detonation tube combustor 210 has a long tube wrapped around a contoured circumferential surface of the engine core 202. In other embodiments, the pulse detonation tube combustor 210 is configured to extend circumferentially around at least one component of the engine 20, and is supported by spacers. As a result, a large portion of the pulse detonation tube combustor 210 is arcuate and forms a spirally combustion path around the axis A. The long tube serves as a detonation passage for the pulse detonation tube combustor 210, and the arcuate path of the tube provides a longer "detonation length" for a given axial length along the engine axis. In one embodiment, the tubes may have a curvature with large radii that does not deter detonation and which may aid in the deflagration-to-detonation transition process.

Referring again to FIG. 2A, the pulse detonation tube combustor 210 has an air port (not shown), a fuel injector 220 at an ignition end 212 of the pulse detonation tube combustor 210. The pulse detonation tube combustor 210 has an exit 216 at the other end thereof. Because a majority of the pulse detonation tube combustor 210 is disposed substantially not parallel to the central longitudinal axis A, and also because the pulse detonation tube combustor 210 is arcuate, the length of pulse detonation tube combustor 210 between the inlet at ignition end 212 and outlet (exit) 216 utilized can be significantly longer for a given axial length of the engine core 202 along axis A, and longer than it would be were the pulse detonation combustor tube 210 oriented parallel to the axis A. Thus, it will be appreciated that the orientation of pulse detonation tube combustor 210 in accordance with the present disclosure improves compactness and can provide a required detonation length while minimizing the impact on existing engine components and the peripheral footprint thereof.

Referring to FIG. 2B, a front view of the pulse detonation system 200 shows that the cylindrical engine core 202 has an exemplary circular cross-section, and the pulse detonation tube combustor 210 is curved so that it conforms to the circumferential surface of the engine core 202. In certain embodiments, the length of the pulse detonation combustor tube 210 provided can be altered by increasing or decreasing the degree of wrap (e.g., by utilizing a high or low helical angle with respect to the central axis A—the "degree of wrap", or by utilizing varying angles with respect to axis A (to vary the pitch along axis A). It will also be appreciated that the larger the angle of tube combustor 210 relative to axis A, the shorter the pitch along axis A, and thus the greater the length of combustor 210 that can be utilized for a given axial length and outer diameter of the engine core 202.

As shown in FIG. 2B, another pulse detonation tube combustor 250 is similarly fastened to the engine core 202. The pulse detonation tube combustor 250 has a long tube 250 as a combustion passage, an air port, or ignition end 252, a fuel injector 260 and an exit or outlet 256. In other embodiments, three or more combustors can be similarly fastened to the circumferential surface of the engine core 202 in a ring fashion. It is more desirable to evenly distribute multiple combustors around the engine core 202.

Although FIG. 2B shows that while the pulse detonation system 200 has only one ring of combustors, it will be appreciated that multiple combustor rings of different diameters can be utilized and disposed in parallel to provide more thrust for the engine.

It should also be realized that the engine core 202 can either be static in reference to or rotate with the low speed spool 30 (see FIG. 1). In one embodiment, the pulse detonation tube combustor 210 is upstream to the turbine section 28, exhaust flow exiting the pulse detonation tube combustor 210 drive the turbine section 28 and hence the low speed spool 30 to rotate. In another embodiment, each of a plurality of pulse detonation tube combustors (not shown) may provide an angled exhaust flow, so that a torque, in addition to a forward thrust, is provided to the engine core 202 to drive its rotation. In this case, the engine does not need a turbine. In one embodiment, the pulse detonation tube 210 is disposed in a direction that is angularly offset from spiral portion of pulse detonation tube 210.

While this disclosure has been particularly shown and described with references to exemplary embodiments thereof, it shall be understood by those skilled in the art that various changes in form and details may be made therein without departing from the spirit of the claimed embodiments.

What is claimed is:

1. A combustor for a gas turbine engine, the gas turbine engine having an engine central longitudinal axis, the combustor comprising:
    a cylindrical structure disposed around the engine central longitudinal axis, the cylindrical structure including a cylindrical surface, an upstream cylindrical structure inlet and a downstream cylindrical structure outlet,
    a plurality of combustion tubes circumferentially spaced about the cylindrical structure, each combustion tube of the plurality of combustion tubes being a pulse detonation tube having an upstream tube inlet, a downstream tube outlet, and an elongated arcuate portion extending therebetween that is wrapped around the cylindrical surface, each upstream tube inlet and each downstream tube outlet extending parallel to the engine central longitudinal axis, and each combustion tube of the plurality of combustion tubes being radially exterior to the cylindrical surface from the upstream cylindrical structure inlet to the downstream cylindrical structure outlet.

2. The combustor of claim 1, wherein the plurality of combustion tubes are disposed circumferentially around at least one component of the gas turbine engine.

3. The combustor of claim 1, wherein a length of each combustion tube of the plurality of combustion tubes is substantially longer than an axial distance which each combustion tube occupies.

4. The combustor of claim 1, wherein each combustion tube of the plurality of combustion tubes is static in reference to an enclosure of the gas turbine engine during operation.

5. The combustor of claim 1, further comprising a turbine disposed downstream of the plurality of combustion tubes.

6. A gas turbine engine comprising a combustor, the gas turbine engine having an engine central longitudinal axis, the combustor comprising:
    a cylindrical structure disposed around the engine central longitudinal axis, the cylindrical structure including an exterior cylindrical surface, an upstream cylindrical structure inlet and a downstream cylindrical structure outlet,
    a plurality of combustion tubes circumferentially spaced about the cylindrical structure, each combustion tube of the plurality of combustion tubes being a pulse detonation tube having an upstream tube inlet, a downstream tube outlet, and an elongated arcuate portion extending therebetween that is wrapped around the exterior cylindrical surface, each upstream tube inlet and each downstream tube outlet extending parallel to the engine central longitudinal axis, and each combustion tube of the plurality of combustion tubes being radially exterior to the exterior cylindrical surface from the upstream cylindrical structure inlet to the downstream cylindrical structure outlet.

7. The engine of claim 6, wherein each combustion tube of the plurality of combustion tubes is disposed circumferentially around at least one component of the engine.

8. The engine of claim 6, wherein a length of each combustion tube of the plurality of combustion tubes is substantially longer than an axial distance each combustion tube of the plurality of combustion tubes.

9. The engine of claim 6, wherein the plurality of combustion tubes are static in reference to an enclosure of the engine during operation.

10. The engine of claim 6, further comprising a turbine disposed downstream of the plurality of combustion tubes.

* * * * *